United States Patent [19]
Merchant

[11] Patent Number: 5,987,386
[45] Date of Patent: Nov. 16, 1999

[54] INTERPOLATION OF INDUCTION TOOL RESPONSE USING GEOMETRICAL FACTORS AS BASIS FUNCTIONS

[75] Inventor: Gulamabbas A. Merchant, Houston, Tex.

[73] Assignee: Halliburton Energy Services, Inc.

[21] Appl. No.: 08/942,517

[22] Filed: Oct. 2, 1997

Related U.S. Application Data

[60] Provisional application No. 60/044,632, Apr. 18, 1997.

[51] Int. Cl.[6] ........................................................ G06F 19/00
[52] U.S. Cl. ................................................................ 702/7
[58] Field of Search ................................ 702/7; 324/339, 324/342, 343

[56] References Cited

PUBLICATIONS

H.G. Doll; Petroleum Transactions, AIME, Introduction to Induction Logging and Application to Logging of Wells Drilled with Oil Base Mud; V. 1, No. 6, Jun. (pp. 14–1–14–15).

J.H. Morani; K. S. Kunz; Basic Theory of Induction Logging and Application to Study of Two–Coil Sondes; Geophysics, V. 27, No. 6, Dec. (pp.16–1–16–30).

G. A. Merchant; Halliburton Logging Services; Modelling Induction Tools in Layered Formation (undated); (pp. 1–9) and Appendix.

*Primary Examiner*—Donald E. McElheny, Jr.
*Attorney, Agent, or Firm*—Conley, Rose & Tayon, P.C.

[57] ABSTRACT

A method for estimating the apparent conductivity of a formation comprises the steps of: providing layer conductivity data over a range of points in the formation outside the borehole along a portion of a borehole, calculating an apparent conductivity at a first series of points in the range, calculating a Doll-generated conductivity at each of the first points, calculating a skin effect by calculating a difference value between the Doll-generated conductivity and the apparent conductivity at each of the first points, calculating a Doll-generated conductivity at a second series of points that are different from the first points, calculating an interpolated difference value for each of the second points, and adding to interpolated difference value to the corresponding Doll-generated conductivity at each of the second points. Alternatively, the skin effect can be calculated at each of the first points by calculating the ratio of the apparent conductivity to the Doll-generated conductivity at each of the first points. The interpolation steps can be either linear interpolation or geometric interpolation.

20 Claims, 2 Drawing Sheets

INTERPOLATION OF INDUCTION TOOL RESPONSE USING GEOMETRICAL FACTORS AS BASIS FUNCTIONS

CROSS-REFERENCE TO RELATED APPLICATIONS

The present application claims the benefit of U.S. Provisional Application Serial No. 60/044,632 filed Apr. 18, 1997 entitled Interpolation of Induction Tool Response Using Geometrical Factors as Basis Functions.

STATEMENT REGARDING FEDERALLY SPONSORED RESEARCH OR DEVELOPMENT

Not applicable.

BACKGROUND OF THE INVENTION

The present invention relates generally to an induction logging system for measuring characteristics of formations through which a wellbore has been or is being drilled. More particularly, the present invention relates to a method for processing induction logging data efficiently so that a useful amount of information can be obtained with a relatively small number of calculations. Still more particularly, the present invention relates to a method for interpolating real data efficiently using a physically appropriate response function as the basis function for the interpolation.

Modern petroleum drilling and production operations demand a great quantity of information relating to parameters and conditions downhole. Such information typically includes characteristics of the earth formations traversed by the wellbore, in addition to data relating to the size and configuration of the borehole itself. The collection of information relating to conditions downhole, which commonly is referred to as "logging," can be performed by several methods. Oil well logging has been known in the industry for many years as a technique for providing information to a driller regarding the particular earth formation being drilled. In conventional oil well wireline logging, a probe or "sonde" is lowered into the borehole after some or all of the well has been drilled, and is used to determine certain characteristics of the formations traversed by the borehole. The sonde may include one or more sensors to measure parameters downhole and typically is constructed as a hermetically sealed cylinder for housing the sensors, which hangs at the end of a long cable or "wireline." The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface. In accordance with conventional techniques, various parameters of the earth's formations are measured and correlated with the position of the sonde in the borehole, as the sonde is pulled uphole.

The sensors used in a wireline sonde usually include a source device for transmitting energy into the formation, and one or more receivers for detecting the energy reflected from the formation. Various sensors have been used to determine particular characteristics of the formation, including nuclear sensors, acoustic sensors, and electrical sensors. See generally J. Lab, *A Practical Introduction to Borehole Geophysics* (Society of Exploration Geophysicists 1986); D. R. Skinner, *Introduction to Petroleum Production,* Volume 1, at 54–63 (Gulf Publishing Co. 1981).

For a formation to contain petroleum, and for the formation to permit the petroleum to flow through it, the rock comprising the formation must have certain well known physical characteristics. One measurable characteristic is the resistivity (or conductivity) of the formation, which can be determined by inducing an alternating electromagnetic field into the formation by a transmitter/receiver coil arrangement. The electromagnetic field induces alternating electric (or eddy) currents in the formation in paths that are substantially coaxial with the transmitter. These currents in turn create a secondary electromagnetic field in the medium, inducing an alternating voltage at the receiver coil. If the current in the transmitter coil is kept constant, the eddy current intensity is proportional to the conductivity of the formation. Consequently, the conductivity of the formation determines the intensity of the secondary electromagnetic field, and thus, the amplitude of the voltage at the receiver coil. As will be apparent to one skilled in the art, the propagating electromagnetic wave suffers both attenuation and phase shift as it traverses the formation. See generally, James R. Jordan, et al., *Well Logging II—Electric And Acoustic Logging,* SPE Monograph Series, Volume 10, at 71–87 (1986).

An exemplary induction tool is shown in the prior art drawing of FIG. 1, in which one or more transmitters (T) and a plurality of receivers ($R_i$) are shown in a logging sonde. An oscillator supplies alternating current to the transmitter coils, thereby inducing current in the receiver coils that is measured, processed and sent to the surface of the well for recording. The voltage induced in the receiver coils results from the sum of all eddy currents induced in the surrounding formations by all transmitters. Typically, phase sensitive detectors are used to measure those components of the receiver voltage that are in-phase or in quadrature with the transmitter current.

As noted, the induced eddy currents tend to flow in circular paths that are coaxial with the transmitter coil. As shown in FIG. 1, for a vertical borehole traversing horizontally layered formations, there is a general symmetry for the induced current around the logging tool. In this ideal situation, each line of current flow remains in the same formation along its entire flow path, and never crosses a bed boundary. In this type of layered environment, the presence of the borehole can, to a first approximation, be neglected and the tool response can be modeled as an array of coils immersed in the formation without a borehole. This approximation breaks down when the borehole fluid is highly conductive, however, the present invention is directed primarily to logging situations in which a non-conductive fluid is used.

Because the data measured by the sonde is influenced by several factors, the conductivity measurements typically require adjustment to compensate for these influences. One common approach for verifying data is to calculate an estimate of the formation conductivity on the basis of other, known factors, use computer modeling programs to generate a simulation of the measured conductivity, hereinafter referred to as the "apparent conductivity," and then compare the apparent conductivity to the measured values. The algorithms for these analyses are known in the art and are set out in the report *Modeling Induction Tools in Layered Formations,* G. A. Merchant, Halliburton Logging Services, given at the SPWLA Topical Conference, Apr. 22, 21–24, 1997 South Padre Island, Tex., which is hereby incorporated by reference in its entirety.

One method for estimating conductivity, for example, entails the use of geometrical factors. The Doll geometrical factor is the response of the induction tool to very thin beds in a low conductivity (high resistivity) medium. The Doll geometrical factor is named after H. D. Doll, who introduced it in a paper entitled "*Introduction to Induction Logging and Application to Logging of Wells Drilled with Oil-based Mud,*" *Petroleum Transactions,* AIME, vol. 1, no. 6, June 1949, pp. 148–162. The Doll geometrical factor is also discussed by Moran and Kunz in "*Basic Theory on Induction Logging and Application to Study of Two Coil Sonde,*" *Geophysics,* vol. XXVII, no. 6, December 1962, pp. 829–858, 26.

Heretofore, it has been necessary to calculate the apparent conductivity using complex and time-consuming iterations. Because each data point requires a lengthy series of calculations and because of the large number of data points, a system for reducing the number of calculations that must be performed is desired. Examples of the necessary calculations and previous attempts to streamline them are discussed in the paper cited above.

BRIEF DESCRIPTION OF THE DRAWINGS

For a more detailed description of the preferred embodiment of the present invention, reference will now be made to the accompanying drawings, wherein.

DETAILED DESCRIPTION OF THE INVENTION

The present invention includes a method for reducing the amount of time-consuming, and therefore expensive, computation that must be performed to generate an apparent conductivity. According to the present invention, the apparent conductivity $\sigma_a$ is calculated as function of a received EMF signal over a range or portion of the borehole. The apparent conductivity $\sigma_a$ is calculated for some reduced number of points that is much smaller than the number of points for which data is desired. This reduction in the number of points is accomplished by increasing the spacing between the calculated points. For example, the number of calculations that must be performed can be reduced by 75% if the points at which apparent conductivity is calculated are four times farther apart than the desired information points. The reduced points are preferably, but not necessarily, evenly spaced along the region of interest.

Once the apparent conductivity is calculated for the reduced number of points, an apparent conductivity for the intervening points can be calculated in some manner that is less time-consuming and expensive. One way to obtain data for the intervening points would be to use linear interpolation between each pair of calculated points. This is not a practical solution, however, as it is not sufficiently accurate.

According to the present invention, the Doll-generated apparent conductivity for each of the desired points along the tool, $\sigma_{aD}$, is calculated using the Doll geometrical factor for the tool. The desired points include all of the reduced number of points, plus some number of additional points. In one preferred embodiment, the number of additional points is 2–5, and more preferably 3–4 times the reduced number of points. The additional points may be, but are not necessarily, evenly spaced between the reduced points. The use of Doll geometrical factors is known for generating the Doll-response, although they have not heretofore been used to improve the accuracy of data generated by an interpolation process.

For each of the reduced number of points, for which an accurate value of the apparent conductivity was previously calculated in the more time-consuming manner, the conductivity skin effect contribution δ is calculated by subtracting the Doll-generated conductivity $\sigma_{aD}$ from the apparent conductivity $\sigma_a$. This step gives a set of skin effect contributions corresponding to each of the reduced points. Still according to the present invention, the conductivities $\sigma_{aD}$ calculated using the Doll geometrical factors for all of the desired points are corrected for the skin effect contribution by linearly interpolating the skin effect contribution at each of the desired points along the tool and adding it to the apparent conductivity at that point.

Figure 1:
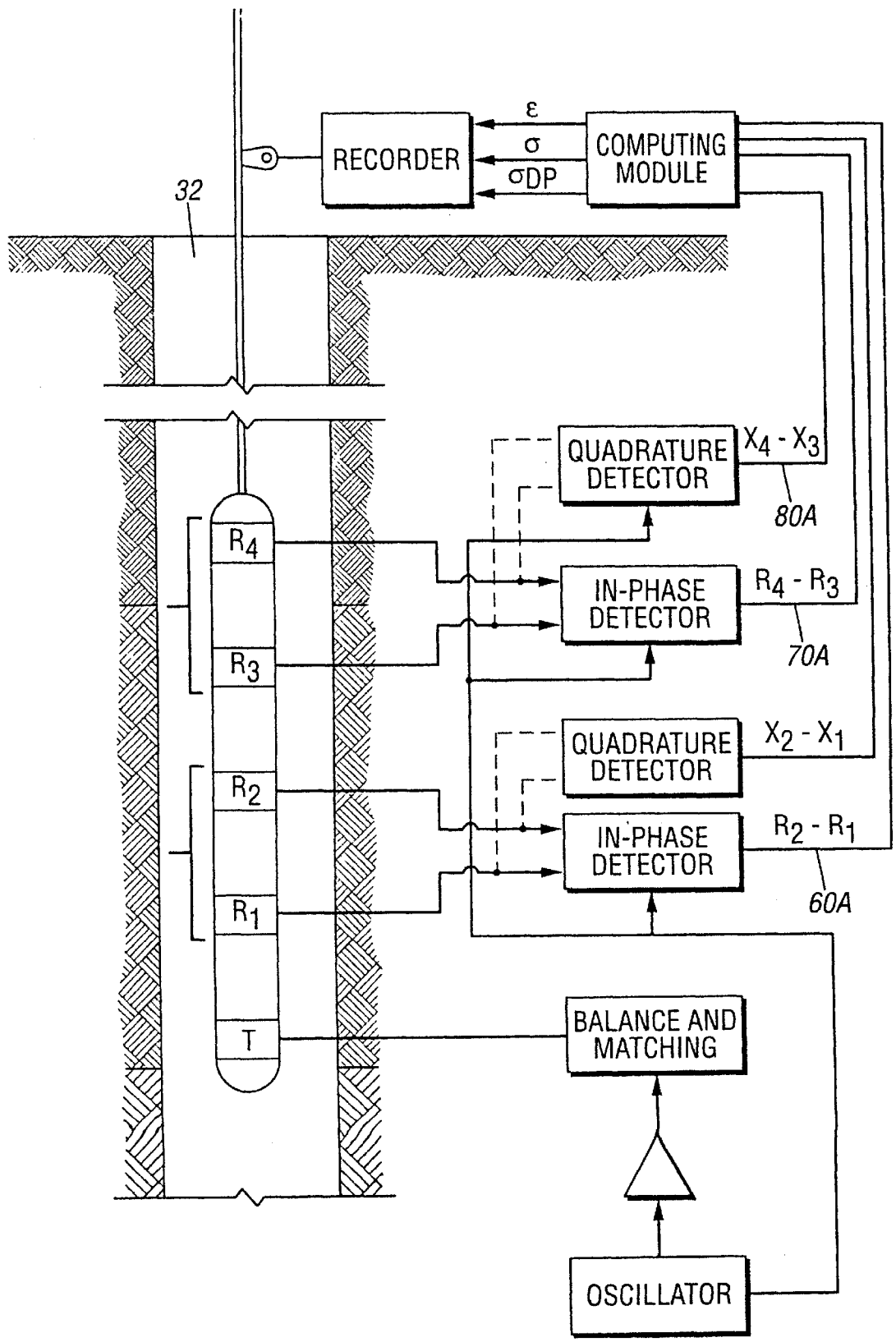
FIG. 1 is an illustration of a prior art induction logging system.
Figure 2:
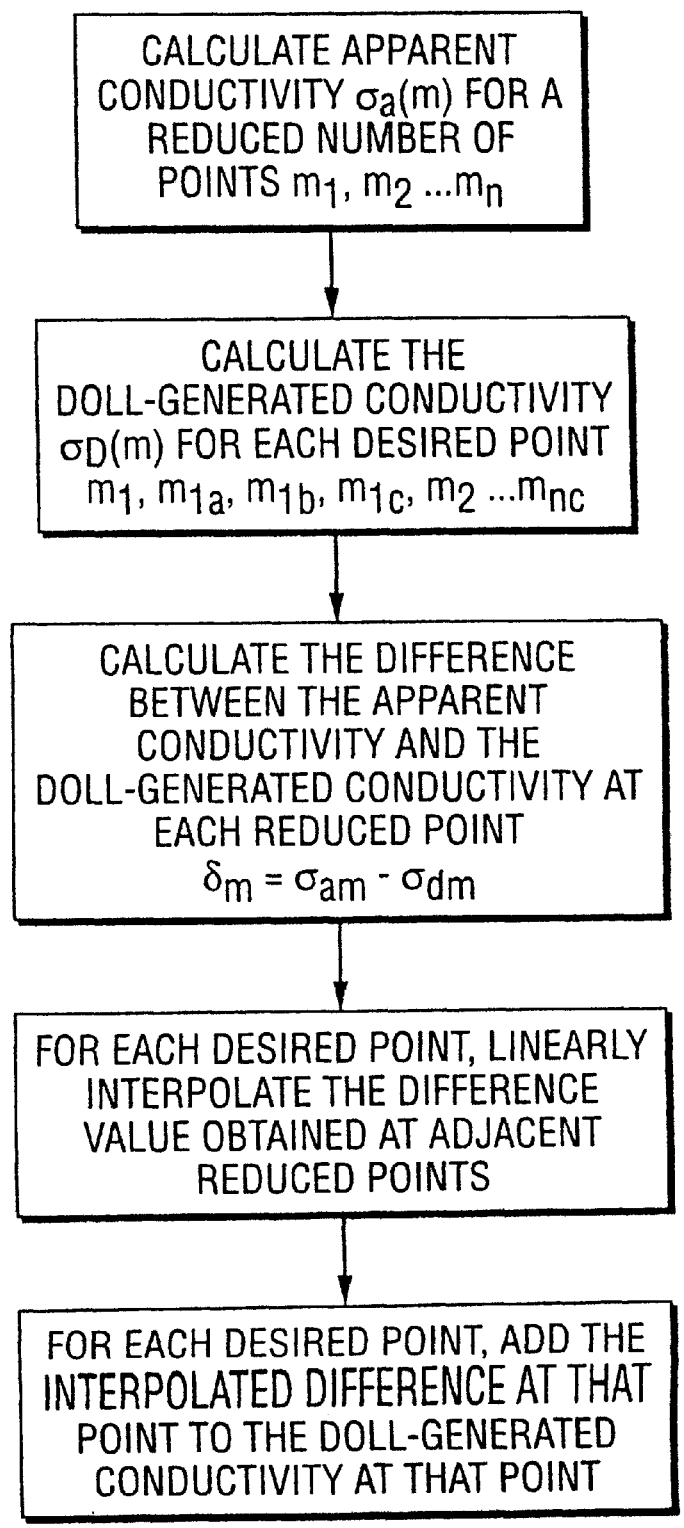
FIG. 2 is a schematic diagram of the concepts of the present invention.

FIG. 2 shows in schematic form the steps entailed in carrying out the present process. It has been found that the conductivity data generated in this manner are more accurate than those generated by linear interpolation techniques.

Alternatively, the skin effect contribution for each additional point can be calculated using geometric interpolation instead of linear interpolation. In this method, the ratio of the apparent conductivity $\sigma_a$ to the Doll-generated conductivity $\sigma_{aD}$ at each reduced point, rather than the difference between them, can be used to correct the Doll-generated conductivity $\sigma_{aD}$ at the additional points. The ratio can be interpolated using a fractional power or a linear interpolation technique.

The steps described above can be used advantageously in either wireline logging or logging while drilling (LWD) by using appropriate geometrical factors. Furthermore, the steps described above can be used to facilitate calculation of other parameters in other contexts. Specifically, for any context for which it is possible to derive the response of a measuring tool independently from its environment, the equivalent of the Doll geometrical factor for that tool can be used in the manner described above.

While preferred embodiments of the present invention are set out above, it will be understood that variations may be made to the present method without departing from the scope of the invention.

What is claimed is:

1. A method for estimating the apparent conductivity of a formation, comprising the steps of:
   (a) providing layer conductivity data for points over a range of the formation;
   (b) calculating an apparent conductivity at a first series of points in the range, the apparent conductivity being a function of the layer conductivity provided in step (a);
   (c) calculating a Doll-generated conductivity at each of the first points, the Doll-generated apparent conductivity being a function of the layer conductivity and tool depth;
   (d) calculating a difference value δ between the Doll-generated conductivity and the apparent conductivity at each of the first points;
   (e) calculating a Doll-generated conductivity at a second series of points that are different from the first points;
   (f) calculating a difference value δ, for each of the second points using the difference values δ calculated instep (d); and
   (g) adding the difference value $\delta_i$ from step (f) to the corresponding Doll-generated conductivity at each of the second points.

2. The method according to claim 1 wherein the first points are substantially evenly spaced along the measured portion of the borehole.

3. The method according to claim 1 wherein each of the second points lies between a pair of the first points and the difference value $\delta_i$ is interpolated from the difference values $\delta$ calculated in step (d).

4. The method according to claim 3 wherein the second points are substantially evenly spaced between the first points.

5. The method according to claim 1 wherein the number of second points is at least equal to the number of first points.

6. The method according to claim 1 wherein the number of second points is equal to at least two times the number of first points.

7. The method according to claim 1 wherein step (a) is carried out while drilling.

8. The method according to claim 1 wherein step (a) is not carried out while drilling.

9. The method according to claim 1 wherein the calculation of step (f) is linear interpolation.

10. The method according to claim 1 wherein the calculation of step (f) is geometric interpolation.

11. A method for estimating the apparent conductivity of a formation, comprising the steps of:
   (a) providing layer conductivity data for points over a range of the formation;
   (b) calculating an apparent conductivity at a first series of points in the range, the apparent conductivity being a function of the layer conductivity data provided in step (a);
   (c) calculating a Doll-generated conductivity at each of the first points, the Doll-generated apparent conductivity being a function of conductivity and depth;
   (d) calculating a skin effect at each of the first points by calculating the ratio of the apparent conductivity to the Doll-generated conductivity at each of the first points;
   (e) calculating a Doll-generated conductivity at a second series of points that are different from the first points;
   (f) calculating a skin effect for each of the second points using the skin effect values calculated in step (d); and
   (g) adding the skin effect from step (f) to the Doll-generated conductivity at each of the second points.

12. The method according to claim 11 wherein the first points are substantially evenly spaced along the measured portion of the borehole.

13. The method according to claim 11 wherein each of the second points lies between a pair of the first points and the skin effect is interpolated from the skin effects calculated in step (d).

14. The method according to claim 13 wherein the second points are substantially evenly spaced between the first points.

15. The method according to claim 11 wherein the number of second points is at least equal to the number of first points.

16. The method according to claim 11 wherein the number of second points is equal to at least two times the number of first points.

17. The method according to claim 11 wherein step (a) is carried out while drilling.

18. The method according to claim 11 wherein step (a) is not carried out while drilling.

19. The method according to claim 11 wherein the calculation of step (f) is linear interpolation.

20. The method according to claim 11 wherein the calculation of step (f) is geometric interpolation.

* * * * *